Patented Feb. 14, 1939

2,147,256

UNITED STATES PATENT OFFICE 2,147,256

PROCESS FOR ALKYLATING PHENOLS

Vladimir Ipatieff and Herman Pines, Chicago, Ill., assignors to Universal Oil Products Company, Chicago, Ill., a corporation of Delaware No Drawing. Application March 7, 1935, Serial No. 9,828

2 Claims. (Cl. 260—624)

This invention relates particularly to the manufacture of compounds of a cyclic character containing alkyl and hydroxyl groups.

More specifically the invention has reference to a process for manufacturing derivatives of the class of compounds known generally as phenols which comprises either mono or polynuclear ring compounds containing hydroxyl groups.

The phenols constitute an important class of chemical compounds which occur in varying amounts in the products obtained when distilling various carbonaceous materials such as coal, shale, lignite, peat, wood, etc. Many of these individual compounds and the commercial mixtures obtained from primary distillation products have value as germicides and insecticides and as base products for the manufacture of more complicated substances such as, for example, various resinous condensation products produced by reacting phenols and aldehydes.

The following table gives a list of some of the mono nuclear phenols of a mono, di and trihydric character:

TABLE I

Mono nuclear phenols

| Compound | M. P. °C. | B. P. °C. |
|---|---|---|
| Phenol | 43 | 183 |

Di-hydric phenols

| Compound | M. P. °C. | B. P. °C. |
|---|---|---|
| Pyrocatechol | o 104 | 240–5 |
| Resorcinol | m 116 | 276.5 |
| Hydroquinone | p 169 | 285 |

Tri-hydric phenols

| Compound | M. P. °C. | B. P. °C. |
|---|---|---|
| Pyrogallol | 1,2,3 133 | Dec. at 293 °C. |
| Oxyhydroquinone | 1,2,4 140.5 |  |
| Phloroglucinol | 1,3,5 218 | Subl. dec. |

The above table omits the citation of compounds in which 4, 5 or all 6 of the original benzol hydrogen atoms are replaced by hydroxyl groups, although the 4 and 5 hydroxyl compounds may also be alkylated with olefin hydrocarbons according to the process of the present invention.

The general order of phenols includes also the three cresols, the corresponding ethyl, propyl, butyl and higher alkyl-substituted phenols and the various isomerides which are possible when there is multiple substitution in the ring. Examples of this more highly substituted class are the group comprising thymol and carvacrol which are two of the twenty methyl isopropyl phenols.

The invention further comprises the manufacture of derivatives of polynuclear phenols which are characterized by such compounds as alpha naphthol with a melting point of 94° C. and a boiling point of 297° C. and beta naphthol with a melting point of 122° C. and a boiling point of 285.5° C.

In one specific embodiment the present invention comprises the production of derivatives of phenols by treating them with unsaturated hydrocarbons comprising olefins in the presence of phosphoric acid catalysts, the reactions being conducted with the phenols dissolved in non-polar solvents.

We have discovered that the production of derivatives of phenols by treatment with unsaturated hydrocarbon compounds of an olefinic character may be accomplished with greatly improved efficiency by dissolving the reacting constituents in polar solvents generally of a hydrocarbon character and by using phosphoric acid instead of such previously used condensing agents as sulfuric acid and heavy metal chlorides including aluminum and zinc chlorides. When using such reagents, particularly in the absence of suitably selected polar solvents, the reactions of alkylation of phenols are attended by various types of undesirable side reactions which decrease the yield of desired products. For example, when using sulfuric acid of sufficient concentration to produce good yields of alkylated derivatives of phenols by reacting olefins therewith, there is always an undesirable amount of sulphonation and tar formation. With aluminum chloride and similar compounds there is also a considerable loss on account of the formation of addition compounds of an intermediate character which gradually resinify to produce heavy residues of no value.

In contrast to the difficulties experienced previously the use of solvents and phosphoric acid (and other suitable acids of phosphorus) according to the process of the present invention minimizes the side reactions and produces high yields of compounds of the desired character, to-wit, phenols with ring hydrogen atoms substituted by alkyl residues. As will be developed in a later example, the use of solutions of phenols in proper solvents rather than phenols alone results in maximum yields of the desired substituted compounds and minimum yields of isomeric mixed ethers, in contrast to the yields produced without solvents.

The reactions involved in the present invention are essentially those between certain types of so-called unsaturated hydrocarbons and phenols to produce alkyl derivatives thereof. The olefins which include both mono and diolefins are known as chain hydrocarbons characterized by double bonds between carbon atoms.

The so-called non-polar solvents which it is preferred to use in conducting the present process leading to the production of derivatives of phenols are generally of a hydrocarbon character and include straight chain paraffin hydrocarbons of moderate boiling point, benzol, cyclohexane, etc. These compounds are substantially unreactive but at the same time cause dilution of the reacting constituents and moderate the action of the catalyst so that side reactions are minimized and maximum yields of desired products are obtained. In contrast to this class of solvents may be mentioned water, acetic acid, alcohols, etc. which are of a decidedly polar character and usually have an adverse effect even when the reactants are sufficiently soluble therein to make their use possible.

In the matter of catalysts the commoner acids of phosphorus such as the well known ortho phosphoric acid and pyro phosphoric acid are generally preferable on account of their ready availability and moderate cost. It is also comprised within the scope of the invention to employ any of the acids of phosphorus alone or in admixture insofar as beneficial and economical results are obtainable thereby. The phosphoric acids in which phosphorus has a valence of 5 are generally preferable over the phosphorus acids. These alternative reagents are not proposed as exact equivalents since to any one sufficiently conversant with the chemical art it is obvious that each will exert its own particular effect in any given case. In the table below a tabulation of the names, formulas and commoner properties of the acids of phosphorus is appended.

it is comprised within the scope of the invention to use pressures above atmospheric whenever necessary or advantageous. This type of operation is essentially a batch procedure, the introduction of the olefin vapor being continued until the desired degree of alkylation is effected, at which time the stream of vapor is stopped and the acid catalyst allowed to settle, the solution of reaction products being run off into suitable storage while the partly spent catalyst is subjected to any suitable necessary purifying or regenerating steps before being further used. The steps of removing the solvent and separating the desired reaction products from the compounds resulting from unavoidable side reactions may involve fractional distillation, fractional crystallization or any other procedure which is found to be essential.

An effective method of contacting which may be applied to continuous operation consists in forcibly injecting olefin vapors, acid catalyst and solutions of phenols into mixing devices positioned inside the top of filled columns, the emulsion produced being allowed to trickle downwardly over the filling material to complete the initiated reactions, all reaction products being withdrawn from the bottom of the tower and separated as before.

The main course of the reactions which occur when solutions of phenols are treated with olefins in the presence of phosphoric acids is illustrated by the following equations:

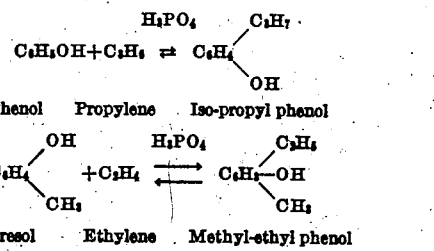

Reactions of the above character may be made

*Acids of phosphorus*

|  |  | M. P. °C. | Dec. °C. |
|---|---|---|---|
| Hypophosphorous | $H_3PO_2$ |  26.5 | Above 200 |
| Orthophosphorous | $H_3PO_3$  $P_2O_3.3H_2O$ | 70.0 | 200 |
| Pyrophosphorous | $H_4P_2O_5$  $P_2O_3.2H_2O$ | 38.0 | 130 |
| Hypophosphoric | $H_4P_2O_6$  $P_2O_5.2H_2O$ | 55.0 | 70 |
| Metaphosphoric | $HPO_3$  $P_2O_5.H_2O$ | Sublimes |  |
| Pyrophosphoric | $H_4P_2O_7$  $P_2O_5.2H_2O$ | 61 |  |
| Orthophosphoric | $H_3PO_4$  $P_2O_5.3H_2O$ | 38.6 | Loses ½ $H_2O$ at 213 |

In producing alkyl derivatives of phenols by employing olefins as the alkylating agents according to the process of the present invention the exact mode of procedure will vary with the nature of the reacting constituents. A very simple procedure in the case of phenols which are sufficiently soluble in such polar hydrocarbon solvents such as cyclohexane, and olefins which are gaseous or readily vaporized, consists in passing the olefin vapor into a suspension of phosphoric acid in the solution of phenol, intimate contacting of the reacting compounds with acid catalyst being assured by either vigorous mechanical agitation or the forcible injection of the vapors in the form of fine bubbles. The optional use of superatmospheric pressure will depend principally upon the volatility of the solvent used and the temperature found most suitable for interacting a given phenol and a given olefin or different mixtures of both groups, and to occur in predominating amounts, frequently 95% of the phenol being converted to mono derivatives without causing the production of phenolic ethers. Limited amounts of di- and tri-substituted products may also be produced.

It is a particular feature of the present invention that when employing substantially neutral and unreactive hydrocarbon solvents there is a greatly diminished tendency for the formation of mixed ethers of both an aryl and an alkyl character in contrast to the products of the same reactions when no solvents are employed.

The process may be employed to effect the reaction between chemical individuals comprising phenols on the one hand and olefins on the other or it may be employed to produce mixtures of alkylated products by using either phenolic mixtures or olefinic mixtures or both. For example, a mixture of alkylated derivatives may be produced by reacting the tar acids separated from various crude tars by caustic alkali (and later acidification) with olefin-containing gas mixtures such, for example, as those encountered in oil cracking processes either aimed primarily at the production of gasoline or of fuel gas. Mixtures thus produced may find application as germicidal, insecticidal or disinfecting material or may in some cases be employed as inhibitors or anti-oxidants for preventing the formation of gummy and resinous polymers from the olefins contained in such materials as cracked gasoline or commercial fuel gases. It is a matter of frequent observation though not always a general rule that the presence of alkyl substituting groups in phenols corresponds to increased inhibiting value. For example, phenol itself has a relatively low value for preventing the deterioration of cracked gasoline upon storage whereas a mixture of cresols commonly known as "tri-cresol" has greatly increased value in this respect. The substitution of alkyl residues of higher molecular weight than the methyl residue, for example, the butyl residue, has been observed to still further increase the value as inhibitors of the base phenolic substances.

The following examples are given to show the character of the results obtainable when interacting olefins with phenols according to the present process although the data are not introduced for the purpose of narrowing the scope of the invention.

The following example illustrates the improved results normally obtainable in alkylating a particular phenol with a particular olefin using phosphoric acid and solvents according to the present process.

A series of four runs were made in alkylating metacresol with propylene. In three of the runs 100% liquid orthophosphoric acid was used and in one run 90% acid. The temperature employed in all runs was 120° C. and both atmospheric and superatmospheric conditions were employed. The atmospheric pressure runs were run under reflux conditions in glass apparatus and the superatmospheric runs were made in rotating bombs equipped with glass liners to eliminate corrosion.

Run I

Thirty parts by weight of 100% phosphoric acid was heated with 60 parts by weight of metacresol and 32 parts by weight of propylene for 12 hours at a temperature of 120° C. The maximum pressure developed was of the order of 30 atmospheres. After cooling, the residual pressure was released and the acid and oil layers separated. The oil layer was treated with a 20% solution of sodium hydroxide and it was found that 60% of the reaction products remained insoluble, indicating that they were ethers.

Run II

Fifty parts by weight of metacresol were heated with 25 parts by weight of 100% phosphoric acid at atmospheric pressure with refluxing. The temperature was held at 120° C. and a stream of pure propylene was passed in for 5 hours. The acid and oil layers were again separated and in this case the treatment of the latter with 20% caustic soda indicated that only 20% was insoluble.

Run III

In this run the conditions employed in Example I in regard to quantities of materials, temperature and pressure were repeated but the cresol was dissolved in about 2 volumes of cyclohexane. As a result of this test it was found after separation of the acid layer and removal of the solvent by distillation that only 5% of insoluble ethers had been produced.

Run IV

In this run the conditions and quantities of Run I were used with the exception of the fact that 90% orthophosphoric acid was used instead of 100% acid. In this case it was found that 25% of alkali-insoluble ethers had been produced.

The following table summarizes the overall results of these four experiments.

|  | Run I | Run II | Run III | Run IV |
| --- | --- | --- | --- | --- |
| Percent phosphoric acid | 100 | 100 | 100 | 90 |
| Temperature, °C | 120 | 120 | 120 | 120 |
| Pressure | Superatmospheric | Atmospheric | Superatmospheric | Superatmospheric |
| Solvent | None | None | Cyclohexane | None |
| Percent alkali insoluble product | 60 | 20 | 5 | 25 |

The above data indicates that the best overall results were obtained in Run III in respect to the production of minimum quantities of alkali insoluble ethers, which shows the superiority of the present process over other methods of operation.

The foregoing specification has disclosed the character of the invention and the experimental data shown have indicated its possibilities but the invention is not limited to the specific details of the description nor the numerical data.

We claim as our invention:

1. A process for alkylating phenols which comprises subjecting a phenol to the action of an olefin hydrocarbon in the presence of an acid of phosphorus and a non-polar solvent, said solvent being in sufficient amount to produce not substantially in excess of 5% alkali insoluble ethers in the reaction product of the process.

2. A process for alkylating phenols which comprises subjecting a phenol to the action of an olefin hydrocarbon in the presence of a phosphoric acid and a non-polar solvent, said solvent being in sufficient amount to produce not substantially in excess of 5% alkali insoluble ethers in the reaction product of the process.

VLADIMIR IPATIEFF.
HERMAN PINES.